Sept. 9, 1947.    C. F. RUBIN    2,427,072
METHOD OF MOUNTING BEARINGS IN PLATES
Filed Aug. 4, 1943
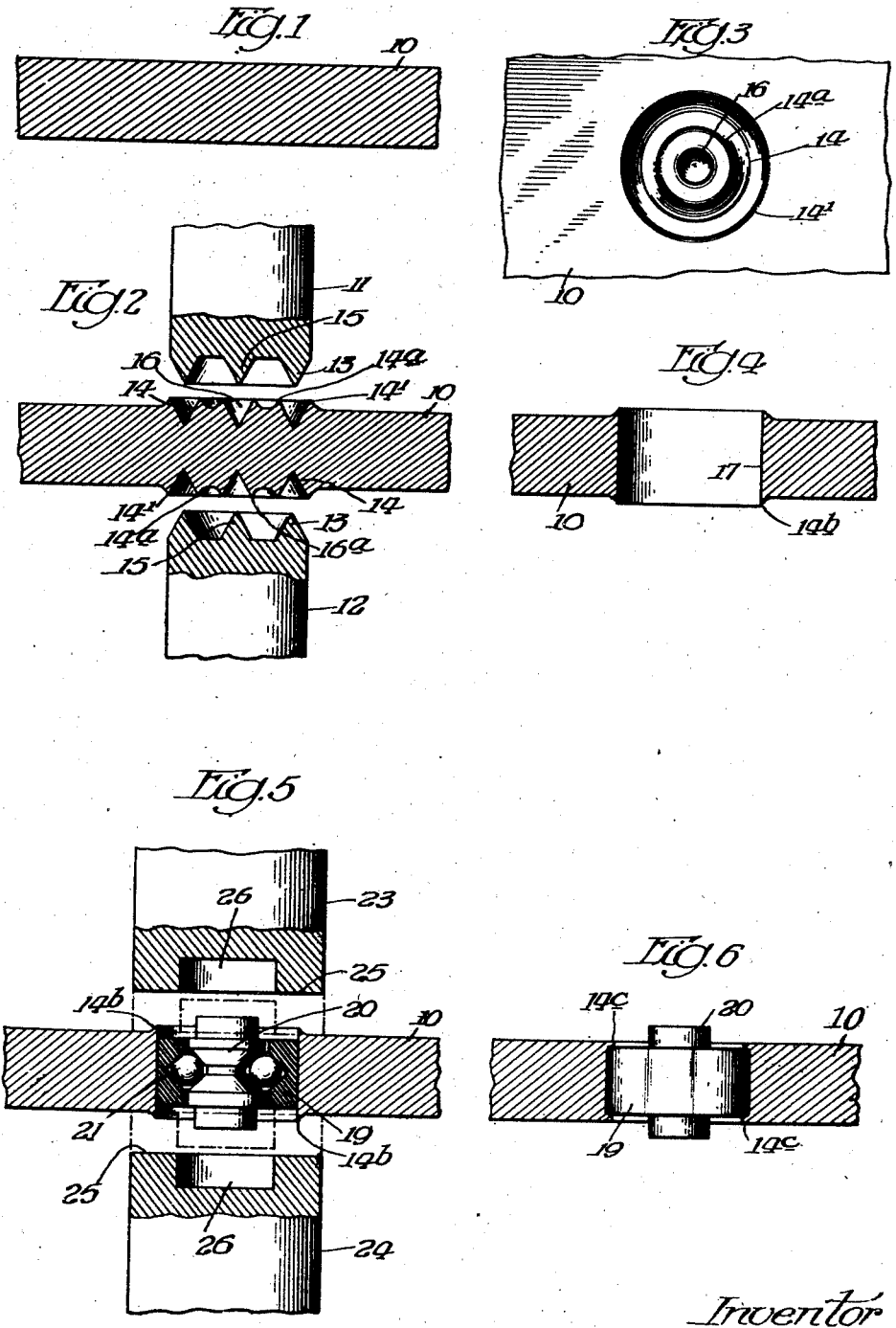
Inventor
Charles F. Rubin
By Fred Gerlach
his Atty.

Patented Sept. 9, 1947

2,427,072

UNITED STATES PATENT OFFICE 2,427,072

METHOD OF MOUNTING BEARINGS IN PLATES

Charles F. Rubin, Fort Worth, Tex., assignor to Consolidated Vultee Aircraft Corporation, San Diego, Calif., a corporation of Delaware Application August 4, 1943, Serial No. 497,338

4 Claims. (Cl. 29—148.4)

The invention relates to a method of mounting antifriction bearings in substantially flat plates.

One object of the invention is to provide an improved method of mounting anti-friction bearings in a plate, which is adapted for high speed and uniform production without requiring highly skilled labor.

Another object of the invention is to provide an improved method of securing the outer race of a ball or anti-friction bearing in a flat plate, by which the race will be secured by die-pressed lip or lips with predetermined and uniform pressure.

Another object of the invention is to provide an improved method of mounting anti-friction bearings in flat plates which are usually slightly thicker than the width of the bearing race.

Other objects of the invention will appear from the detailed description.

The invention consists in the several novel features which are hereinafter set forth and more particularly defined by claims at the conclusion hereof.

In the drawings:

Fig. 1 is a sectional view illustrating the flat or blank plate into which the bearing is to be mounted.

Fig. 2 is a section illustrating the plate and the manner of pressing grooves into it to emboss on its face annular ridges projecting from the faces of the plate.

Fig. 3 is a plan view of the embossed plate shown in Fig. 2.

Fig. 4 is a sectional view of the plate after a cylindrical hole has been cut therethrough to receive the bearing.

Fig. 5 is a section illustrating the plate after the bearing has been inserted in the hole therein and the dies used for pressing the annular projecting ridges around the margins of the hole to secure the bearing in the plate.

Fig. 6 is a sectional view illustrating the plate with the bearing secured therein.

The method of the invention is exemplified for securing the outer ball-race 19 of a pre-assembled anti-friction bearing which comprises said race, an inner race 20 and anti-friction members or balls 21, in a flat plate of metal 10. This plate is slightly greater in thickness than the longitudinal dimension of the races of the anti-friction bearing. The metal plate 10 in which the bearing is to be mounted, is produced from an imperforate flat plate or blank illustrated in Fig. 1.

In the first step of the method the imperforate plate 10 is placed between a pair of coacting dies 11 and 12 which are coaxially reciprocable in and by a suitable press. The plate-engaging end of each of the dies 11 and 12 is provided with an annular plate-indenting projecting portion 13 which is substantially V-shaped in cross section and is adapted to press a correspondingly V-shaped groove or indentation 14 into one face of the plate 10 so as to emboss annular ridges 14' and 14a which have substantially V-shaped portions projecting from the planes of the faces of the plate around the groove 14, as illustrated in Fig. 2. Each of the dies 11 and 12 is also provided with a conical center punch 15 which is adapted to press a conical central recess 16 in one face of the plate. The stroke of the dies 11 and 12 is predetermined to produce grooves 14, centering recesses 16, ridges 14' and 14a around the groove 14, and a ridge 16a of predetermined thickness and depth in the opposite faces of the plate 10, respectively, as illustrated in Fig. 2, and also to produce uniform distribution of the metal, particularly in the projecting ridge 14'. The recesses 16 serve as guides for drilling a hole through the plate 10, as hereinafter described. The dies 11 and 12, when brought together, simultaneously press the grooves 14 and recesses 16 into both faces of the plate 10.

Next, a cylindrical hole 17 is drilled through the plate, utilizing the recess 16 for drilling the hole concentrically with the embossed annular ridge 14', as illustrated in Fig. 4. This hole is accurately reamed to the desired diameter for a press fit around the outer race 19 of the bearing. The hole 17 is of such diameter that its periphery will substantially intersect the apices of the projecting ridges 14' so as to leave portions 14b of the desired amount of metal projecting from the faces of the plates, as illustrated in Fig. 4, for securing the outer bearing race 19 in the plate. This results in providing embossed metal around the hole which under pressure will be forced into and uniformly distributed around the hole, as hereinafter described.

Next, the outer race 19 of the bearing which preferably has been pre-assembled with inner race 20 and balls 21 is pressed into and longitudinally centered in the cylindrical hole 17, as illustrated in Fig. 5. The length of the race 19 is slightly less than the thickness of the plate 10 so that the ends of said race will terminate inwardly of the planes of its faces. The plate with the race 19 therein is placed between dies 23 and 24 which are mounted in a suitable reciprocating press. Each of the dies 23 and 24 has a flat plate-engaging end-face 25 and a central recess 26. Die faces 25 are parallel to the faces of the plate 10 so that when the plate is pressed between said dies the protruding metal in the remaining annular ridge-portions 14b will be pressed flush with the faces of the plate 10. The press is then operated to press the plate 10 between dies 23 and 24, so that the die faces 25 will press the annular projecting portions 14b into the ends of hole 17 and produce annular inturned lips 14c which will engage and lap the end-faces of the ball race 19 and fixedly secure the bearing in the plate 10. The flat end-face 25 of the dies 23 and 24 will be brought together until they abut against and are flush with the faces of the plate 10 and this will result in uniformly shaping the retaining lips 14c to avoid excessive pressure against the outer bearing race 19, and uniform pressure to avoid distortion of said race.

An advantageous characteristic of the invention is that the die-pressing of grooves into the plate for embossing annular ridges on the plate and the cutting of the hole through the ridge result in leaving a uniform and predetermined amount of metal in the ridges 14b which when pressed so it is flush with the faces of the plate 10, will produce a predetermined pressure against the ball-race 19 and a circumferentially uniform pressure against said race. Excessive pressure of the metal in the plate against the outer race of the bearing is likely to distort the race and cause the bearing to bind, and localized or concentration of stresses will result in deformation of the outer race which will also cause the bearing to bind. The remainder of the ridge 14b after the hole 17 has been cut in the plate leaves an accurately predetermined amount of metal in the ridge which when pressed into the hole 17 by the dies 23, 24 for pressing the retaining lips 14c which are flush with the faces of the plate 10 avoids any crushing of the outer race of the bearing when it is secured in the plate. Another advantageous characteristic of the invention is that it is adapted for high and uniform production without highly skilled labor.

So far as I am aware, the methods heretofore used, such as peening the edges of the hole over the outer race by chiseling impressions into the flat plate adjacent the edge of the bearing or spinning the edge of the hole by a rotatable tool, have not resulted in uniform predetermined pressure of the metal in the plate against the bearing and the outer race was frequently distorted by non-uniform or localized concentrations of stresses which caused the bearing to bind and furthermore required highly skilled labor.

In practice, it has been found that bearings mounted in plates in accordance with the present method are capable of withstanding high thrust forces, can be mounted in the plates at a high rate of production with uniform results, and without skilled labor.

The invention is not to be restricted to the details set forth, since these may be modified within the scope of the appended claims without departing from the spirit and scope of the invention.

Having thus described the invention, what I claim as new and desire to secure by Letters Patent is:

1. That improvement which comprises pressing a V-shaped, annular groove in one face of a substantially flat plate so as to emboss a substantially V-shaped annular ridge which projects from the plane of said face of the plate around the groove; cutting a straight cylindrical hole in the plate of a diameter substantially intersecting the apex of the annular ridge; placing into the hole the outer race of a pre-assembled anti-friction bearing which includes an outer race having a substantially straight cylindrical periphery fitting in said hole, an inner race and anti-friction elements between the races with one end of the outer race terminating inwardly of said face of the plate; and depressing the ridge radially inward into the hole, to overlap and engage one end of the outer race for holding the assembly in the hole in the plate.

2. That improvement which comprises simultaneously pressing a V-shaped, annular groove in each of the opposite faces of a substantially flat plate so as to emboss substantially V-shaped annular ridges which project from the planes of the faces of the plate around the groove; cutting a straight hole through the plate of a diameter substantially intersecting the apex of the annular ridges; placing into the hole the outer race of an assembled anti-friction bearing which includes an outer race having a substantially straight cylindrical periphery fitting in said hole, an inner race and anti-friction elements between the races, with the outer ends of the race terminating inwardly of the faces of the plate; and simultaneously depressing the ridges radially inward into the hole, to overlap and engage the ends of the outer race, thereby fixedly gage the ends of the outer race, thereby fixedly securing the assembled bearing in the plate.

3. That improvement which comprises pressing a V-shaped, annular groove in one face of a substantially flat plate so as to emboss a substantially V-shaped annular ridge which projects from the plane of said face of the plate around the groove, and simultaneously pressing a conical centering depression in said face; cutting a straight cylindrical hole in the plate of a diameter substantially intersecting the apex of the annular ridge and around said depression, placing into the hole the outer race of a pre-assembled anti-friction bearing which includes an outer race having a substantially straight cylindrical periphery fitting in said hole, an inner race and anti-friction elements between the races with one end of the outer race terminating inwardly of said face of the plate; and depressing the ridge radially inward into the hole, to overlap and engage one end of the outer race for holding the assembly in the hole in the plate.

4. That improvement which comprises simultaneously pressing a V-shaped, annular groove in each of the opposite faces of a substantially flat plate so as to emboss substantially V-shaped annular ridges which project from the planes of the faces of the plate around the groove and simultaneously depressing conical centering depressions in said faces, cutting a straight hole through the plate of a diameter substantially intersecting the apex of the annular ridges and around said depressions; placing into the hole the outer race of an assembled anti-friction bearing which includes an outer race having a substantially straight cylindrical periphery fitting in said hole, an inner race and anti-friction elements between the races, with the outer ends of the race terminating inwardly of the faces of the plates; and simultaneously depressing the ridges radially inward into the hole, to overlap and engage the ends of the outer race, thereby fixedly securing the assembled bearing in the plate.

CHARLES F. RUBIN.

REFERENCES CITED

The following references are of record in the file of this patent:

UNITED STATES PATENTS

| Number | Name | Date |
|---|---|---|
| 1,642,102 | Colomb | Sept. 13, 1927 |
| 2,304,595 | Prentice | Dec. 8, 1942 |
| 2,057,669 | Brauchler | Oct. 20, 1936 |
| 2,236,180 | Kost | Mar. 25, 1941 |
| 902,322 | Porter | Oct. 27, 1908 |
| 1,301,323 | Schutz | Apr. 22, 1919 |
| 1,695,017 | Kuckuck | Dec. 11, 1938 |

FOREIGN PATENTS

| Number | Country | Date |
|---|---|---|
| 110,323 | Switzerland | June 1, 1925 |